United States Patent [19]
Bryson et al.

[11] Patent Number: 5,474,121
[45] Date of Patent: Dec. 12, 1995

[54] FAN SHROUD WITH LOCATING CLAW

[75] Inventors: Bruce A. Bryson, Arcanum, Ohio; Erin Faessler, Flushing, Mich.; Robert Gmerek, Burt, N.Y.

[73] Assignee: ITT Automotive Electrical Systems Inc., Auburn Hills, Mich.

[21] Appl. No.: 324,936

[22] Filed: Oct. 18, 1994

[51] Int. Cl.⁶ .................................................. F28F 13/06
[52] U.S. Cl. .............................................. 165/41; 165/122
[58] Field of Search .......................... 165/41, 121, 122; 415/220; 416/189; 248/214, 674

[56] References Cited

U.S. PATENT DOCUMENTS

| | | | |
|---|---|---|---|
| 1,853,333 | 4/1932 | Bates | 165/122 X |
| 3,093,189 | 6/1963 | Panthofer | 165/122 X |
| 3,717,258 | 2/1973 | McKinnon | 248/214 X |
| 4,257,554 | 3/1981 | Willingham | 165/122 X |
| 4,971,143 | 11/1990 | Hogan | 165/122 |
| 5,219,016 | 6/1993 | Bolton et al. | 165/41 |
| 5,341,871 | 8/1994 | Stelzer | 165/121 |

*Primary Examiner*—William E. Tapolcai
*Attorney, Agent, or Firm*—Dykema Gossett

[57] ABSTRACT

A fan motor support, for use in combination with a motor vehicle radiator of the type having a U-shaped channel extending along an upper side of the radiator, having a motor mounting portion, a support structure and a claw portion. The motor mounting portion has a motor opening therethrough. The support structure is configured to extend across a portion of a rear surface of the radiator. The claw portion extends from the support structure and has a first member configured to reside in the U-shaped channel.

14 Claims, 1 Drawing Sheet

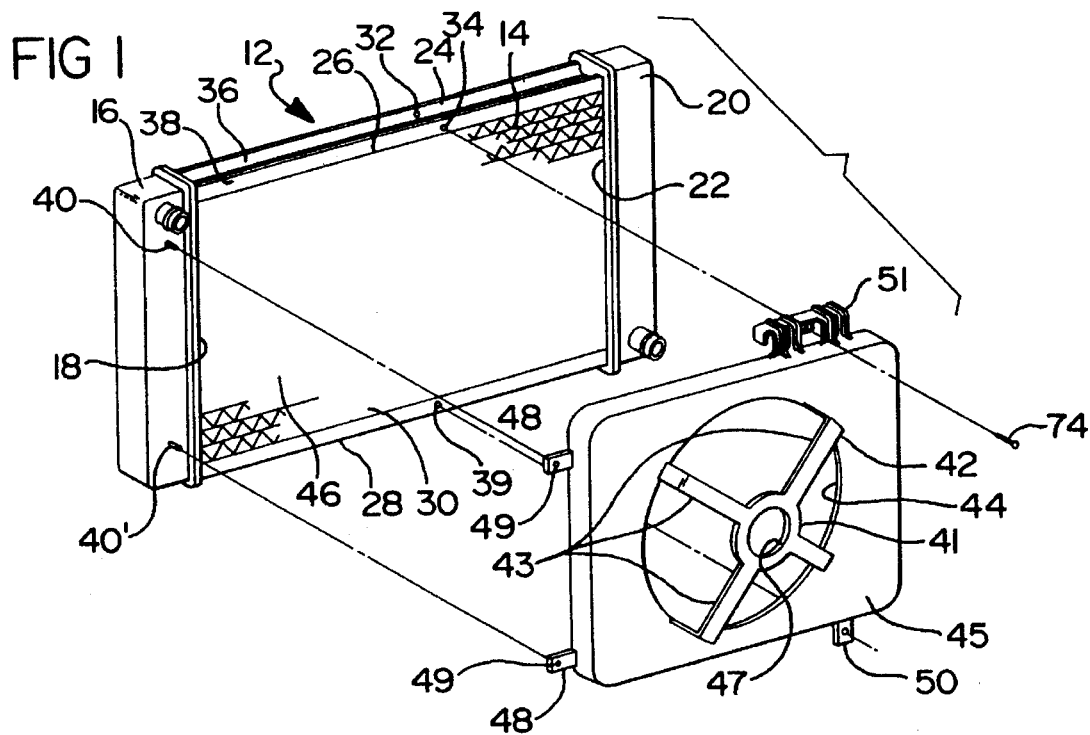
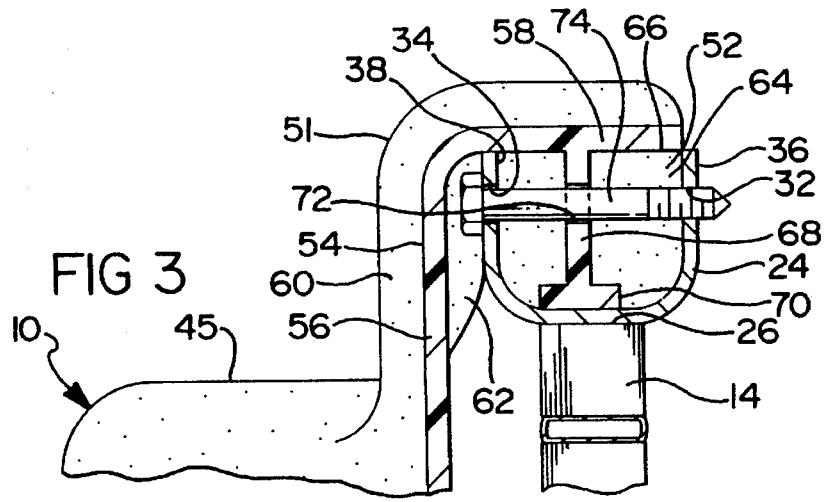
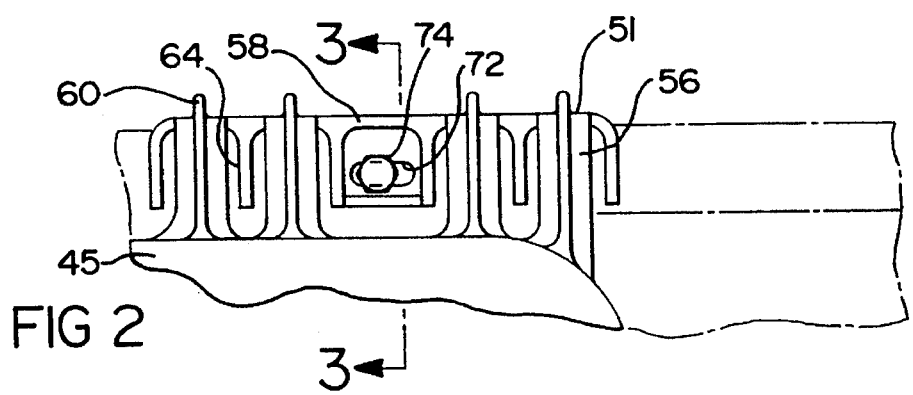

FAN SHROUD WITH LOCATING CLAW

TECHNICAL FIELD

The present invention relates generally to fan supports, including fan support brackets and fan shrouds, for use between motor vehicle radiators and motor vehicle cooling fans, and more particularly to the mounting of fan brackets and fan shrouds to radiators.

BACKGROUND OF THE INVENTION

Fan supports are widely used in motor vehicles today to support electric fan motors driving an engine cooling fan. The supports typically extend across an engine or rear surface of an engine cooling radiator. The support can either be in the form of bracket or a fan shroud. A bracket is a substantially open structure. A fan shroud covers a portion of the rear surface to increase the flow of air drawn through the radiator by the fan. Fan supports are commonly formed from injection molded plastic.

The support is typically mounted to the radiator with a plurality of fasteners or other attaching elements. The fasteners may be bolts threaded into apertures in the radiator or an adjacent radiator support. Alternatively, there may be one or more threaded studs extending from the radiator or radiator support over which the support is placed with nut being threaded down to clamp the support in place. Yet another alternative is to provide a bayonet feature on the fan support engaging a receiving member on the radiator or radiator support.

Commonly, the motor support extends across the entire width of the radiator, and attaches to the radiator or the radiator support. However, in some applications the support extends only partially across the radiator. One of the difficulties with supports extending only partially across the radiator is that there is little structure available to adequately support the side terminating short of one of the radiator sides.

An object of this invention is to provide a fan support with an attaching feature of adequate strength that is easily located on and fixed to an upper portion of the radiator.

SUMMARY OF THE INVENTION

In one aspect of the present invention, a fan motor support for use in combination with a motor vehicle radiator having a U-shaped upper radiator support channel is disclosed comprising a motor mounting portion, a support structure, and a claw portion. The motor mounting portion has a motor opening therethrough. The support structure is configured to extend across a portion of a rear surface of the radiator. The claw portion extends from the support structure and has a first member configured to reside in the U-shaped channel.

In another aspect of the present invention, a radiator and fan motor support combination is disclosed comprising a radiator and a fan shroud in which the fan shroud includes a motor mounting portion, a support structure, and a claw portion. The radiator has a radiator core and a first radiator side tank at a first side and a second radiator side tank at an opposed second side of the radiator core. A U-shaped radiator support channel is located on a third side of the core between the side tanks. The support structure of the fan motor support extends across a portion of a rear surface of the radiator core between the side tanks. The claw portion extends from the support structure portion to the radiator and is partially disposed in the radiator support channel.

The present invention provides a claw on an upper side of a fan motor support engaging a support channel on an upper side of the radiator which facilitates mounting the motor support to the radiator, particularly when the motor support does not extend completely across the radiator. The claw also aids in retention of the shroud to the radiator during assembly.

BRIEF DESCRIPTION OF THE DRAWINGS

FIG. 1 is an exploded view of a radiator and fan motor support combination of the present invention.

FIG. 2 is a partial front view of the locating claw in an installed position.

FIG. 3 is a sectional view of the present invention taken substantially along lines 3—3 of FIG. 2.

DETAILED DESCRIPTION OF THE PREFERRED EMBODIMENT

Now referring to FIG. 1, a fan motor support configured as a fan shroud 10 is mounted to a radiator 12. The radiator 12 has a radiator core 14. There is a first radiator side tank 16 on a first side 18 of the radiator core 14. A second radiator side tank 20 is located on a second side 20 of the radiator core 14, opposite the first side tank 16. A radiator support channel 24 having a U-shaped cross section is on an upper or third side 26 of the core 14. A lower support channel 28 is located along a lower or fourth side 30 of the radiator core 14, opposite the third side 26. These support channels 24 and 28 help maintain the structural integrity of the radiator assembly 12 by providing, together with the side tanks, a frame surrounding the radiator core 14.

The U-shaped support channel 24 has two aligned apertures 32 and 34 passing through, respectively, a front wall 36 and a rear wall 38. An aperture 39 also passes through the lower support channel 28. In the present exemplary embodiment, two threaded studs 40, 40' extend rearward from the first radiator side tank 16.

The shroud 10 has a motor mounting portion 41 and a support structure 42 having arms 43 radiating out therefrom across a fan opening 44 to a covering portion 45. The shroud 10 extends only partially across a rear surface 46 of the radiator core 14. The rear surface 46 is framed by the side tanks 16, 20 and the upper and lower supports 24 and 28. There is a fan motor aperture 47 in the motor mounting portion 45. The exemplary shroud 10 also has two attachment tabs 48 extending from the covering portion 45 with apertures 49 therein which receive the threaded studs 40 and 40' of the radiator 12. A third attachment tab 50 with an aperture therethrough extends from a lower edge of the shroud. The engagement provided by the tabs 48, 50 and the studs 40 and 40' is exemplary only. Alternative forms of engaging elements can be substituted, such as a bayonet feature (not shown) extending from the covering portion.

A claw portion 51 of the shroud 10 extends from the covering portion 45. The claw portion 51 has a first member 52 configured to reside in the U-shaped channel 24 and a second member 54 connecting the first member 52 with the covering portion 45.

Now referring to FIGS. 2 and 3, the second member 54 has four vertical portions 56 extending from the covering portion 45. A horizontal portion 58 of the second member is supported by the vertical portions 56. Reinforcing outer ribs 60 of the second member 54 extend up the vertical portions 56 and across the horizontal portion 58. Inner ribs 62 extend up along the vertical portions 56 to the horizontal portion 58. The ribs 60, 62 minimize deflection of the second member 54 due to bending.

The first member 52 includes a plurality of D-shaped fins 64 projecting downwardly from the horizontal portion 58. Flat sides or edges 66 of the D-shaped fins 64 connect to the horizontal portion 58 which extends along the top of the channel 24. In the exemplary embodiment, the first member 52 has six fins 64. The fins 64 are approximately equally spaced from one another. Two adjacent center fins are connected by a web section 68 substantially parallel to the channel walls 36 and 38. A reinforcement flange 70 extends along a bottom of the web section 68 opposite the horizontal portion 58. The web section 68 has a slot 72 therethrough extending parallel to the horizontal portion 58 across substantially the entire web section 68. The slot 72 is spaced from the horizontal portion 58 a distance substantially equal to a distance from the top of the channel to the apertures 32 and 34 through the walls 36 and 38 of the channel 24. The vertical portions 56 of the second members are located between fins 64, except for between the two center fins 64, thereby leaving the web section 68 and the slot 72 therein completely accessible.

The claw portion 51 is located at a right side of the shroud 10 in this exemplary embodiment. Locating the claw portion 51 at the right side allows it to be used to support the right hand side of the fan shroud, which is particularly useful when the right side of the shroud 10 does not extend to the right or second side tank 20.

A bolt, or screw 74 is used to connect the fan shroud 10 with the radiator 12 at the claw portion 51. The aperture 34 in the rear wall 38 of the channel 24 and the slot 72 in the web section 68 are both sized to allow passage of a shank of the bolt 74 therethrough. The aperture 32 in the front wall 36 is smaller than the rear wall aperture 34 so that threads of the bolt 74 can engage the front aperture 32.

Some of the advantages of providing a locating claw portion on a fan shroud are best appreciated by understanding how the fan shroud 10 is assembled to the radiator 12. As with conventional fan shrouds, the shroud 10 must be aligned with the radiator 12 so that fasteners fixing one to the other can be engaged.

In the exemplary embodiment presented herein, the slot 72 of the claw portion 51 is aligned with the apertures 32 and 34 in the U-channel, and the claw portion 51 is pushed down into the channel 24. The tab apertures 49 are aligned with the studs 40, and a lower edge of the shroud 10 is rotated towards the radiator 12 with the studs 40 passing through the apertures 49. Alternatively, the uppermost of the tabs 48 is placed over the uppermost stud 40. The right side is pivoted up, the claw 51 aligned with the channel 24, and then pressed down into the channel. The lowermost tab 48 is then placed over the lowermost stud 40. With this engagement, the shroud 10 and radiator 12 assembly will generally remain engaged and aligned in a vertical or upright position, even if no fasteners are installed.

The shroud 10 is secured to the radiator assembly 12 by passing the bolt 74 through the aperture 34 in the rear wall and through the slot 72 in the web section 68 to engage the aperture 32 in the front wall 36. The bolt 74 is then threaded down and torqued into place. This is the only fastener needed for engagement of the shroud 10 with either the U-shaped support channel 24 or the lower support channel 28. Nuts (not shown) are run down both of the threaded studs 40, 40' of the exemplary radiator 12, and a screw (not shown) is passed through the tab 50 and threaded into the aperture 39 in the lower channel 28, positively retaining the shroud 10 to the radiator 12. It should be appreciated that the attachment between the radiator 12 and the shroud 10 provided by the threaded studs and attachment tabs 48 and 50 is exemplary only, and that there are many substitutes which can provide the desired attachment. The use of a slot 72 in the web section 68 is advantageous in that it accommodates variation in the location of the apertures 32 and 34 in the channel 24 relative to variations in location of the other mounting features.

The fan shroud 10 presented herein with a claw portion 51 provides an advantageous method of locating and mounting the shroud 10 on the radiator 12. The claw portion 51 facilitates the quick positioning of the shroud 10 on the radiator 12 with subsequently easy installation of fasteners fixing the shroud 10 in place. Additionally, the claw portion 51 provides an attaching member of adequate strength.

Other aspects, objects, and advantages of this invention can be obtained from a study of the drawings, the disclosure and the appended claims.

We claim:

1. A fan motor support for use in combination with a motor vehicle radiator of the type having a U-shaped channel extending along an upper side of the radiator, the fan motor support comprising:

a motor mounting portion defining an aperture accommodating a portion of a fan motor therein;

a support structure radiating out from the motor mounting portion and extending at least partially across a rear surface of the radiator; and a claw portion extending from the support structure portion with a first member configured to reside in the U-shaped channel and a second member connecting the first member with the support structure portion.

2. A fan motor support as claimed in claim 1, wherein the first member has an aperture for alignment with an aperture passing through the channel.

3. A fan motor support as claimed in claim 2, wherein the first member includes a fin adapted to extend into the U-shaped channel.

4. A fan motor support as claimed in claim 3, wherein the first member includes a plurality of a substantially D-shaped fins fitting within the channel and a web substantially parallel to the channel walls connecting at least two of the fins and defining the aperture passing therethrough.

5. A motor support as claimed in claim 2, wherein the aperture in the first member is a slot elongated in a direction parallel to the channel.

6. A fan motor support as claimed in claim 1, wherein the motor support is a unitary integrally molded piece.

7. A fan motor support as claimed in claim 1, wherein the claw portion is on one side of the support structure to engage an end of the channel thereby positioning the shroud to a predetermined position relative to the radiator.

8. A radiator and fan motor support combination comprising:

a radiator having a radiator core and having parallel radiator side tanks at a first side and at an opposed second side of the radiator core and having a U-shaped support channel on a third side of the core between the side tanks;

a secondary mounting feature disposed proximate to the first side;

a motor mounting portion of a fan motor support defining an aperture accommodating a portion of the fan motor therein;

a support structure extending across a portion of a rear surface of the radiator core defined in part by the first, second, and third sides and adapted to engage the secondary mounting feature; and a claw portion of the fan motor support extending to the radiator in part disposed in the channel on the third side.

9. A radiator and fan motor support combination as claimed in claim 8, wherein the motor support is a unitary integrally molded piece including the claw portion, the motor mounting portion, and the support structure.

10. A radiator and fan motor support combination as claimed in claim 8, wherein the claw portion has a first member configured to reside in the U-shaped channel and a second member connecting the first member with the support structure.

11. A radiator and fan motor support combination as claimed in claim 10, wherein the first member has an aperture for alignment with apertures passing through the channel.

12. A radiator and fan motor support combination as claimed in claim 11, wherein the first member has a finned nature.

13. A radiator and fan motor support combination as claimed in claim 12, wherein the first member has a plurality of substantially D-shaped fins fitting within the channel and a web substantially parallel to the channel walls connecting at least two of the fins and defining the aperture passing therethrough.

14. A radiator and motor support combination having a locating claw as claimed in claim 11, wherein the aperture is a slot elongated in a direction parallel to the channel.

* * * * *